United States Patent [19]

Taniguchi

[11] Patent Number: 4,468,065
[45] Date of Patent: Aug. 28, 1984

[54] TAIL GATE OPENING/CLOSING DEVICE FOR DUMP TRUCK

[76] Inventor: Katsuyuki Taniguchi, 1511-11 Yamadacho, Takayama-shi Gifu, Gifu-ken, Japan

[21] Appl. No.: 385,524

[22] Filed: Jun. 7, 1982

[51] Int. Cl.³ .............................................. B60P 1/28
[52] U.S. Cl. .................................. 298/23 R; 16/287; 16/302; 296/56
[58] Field of Search .............. 298/23 R; 296/56, 106, 296/184; 16/286, 287, 302, 365, 366, 371, 374

[56] References Cited

U.S. PATENT DOCUMENTS

| | | | |
|---|---|---|---|
| 2,208,691 | 7/1940 | Voth | 296/56 X |
| 2,246,358 | 6/1941 | Jelinek et al. | 296/56 X |
| 3,195,173 | 7/1965 | McNay et al. | 16/287 |

FOREIGN PATENT DOCUMENTS 592654  2/1978  U.S.S.R. ............................ 298/23 R

*Primary Examiner*—Leslie J. Paperner
*Attorney, Agent, or Firm*—George B. Oujevolk

[57] ABSTRACT

A tail gate opening/closing device for a dump truck in which bracket means are affixed at the upper rear ends of both side walls in the rear part of the carrier section. One end part of a bracket arm is pivotally arranged at each of the ends of the bracket means and each of the other ends is pivotally fastened to the end of a tail gate arm. When material transported such as sand, soil, gravel, etc. is dumped, the carrier section is raised to an angle with the ground causing the material transported to exert pressure on the tail gate so as to open the tail gate in a rearward direction and, at the same time both the bracket arm and the tail gate arm are rotated upwards and the fulcrum of the tail gate arm is also moved upwards. In this way, the tail gate is opened smoothly and the discharge port is opened to the widest extent possible.

5 Claims, 13 Drawing Figures

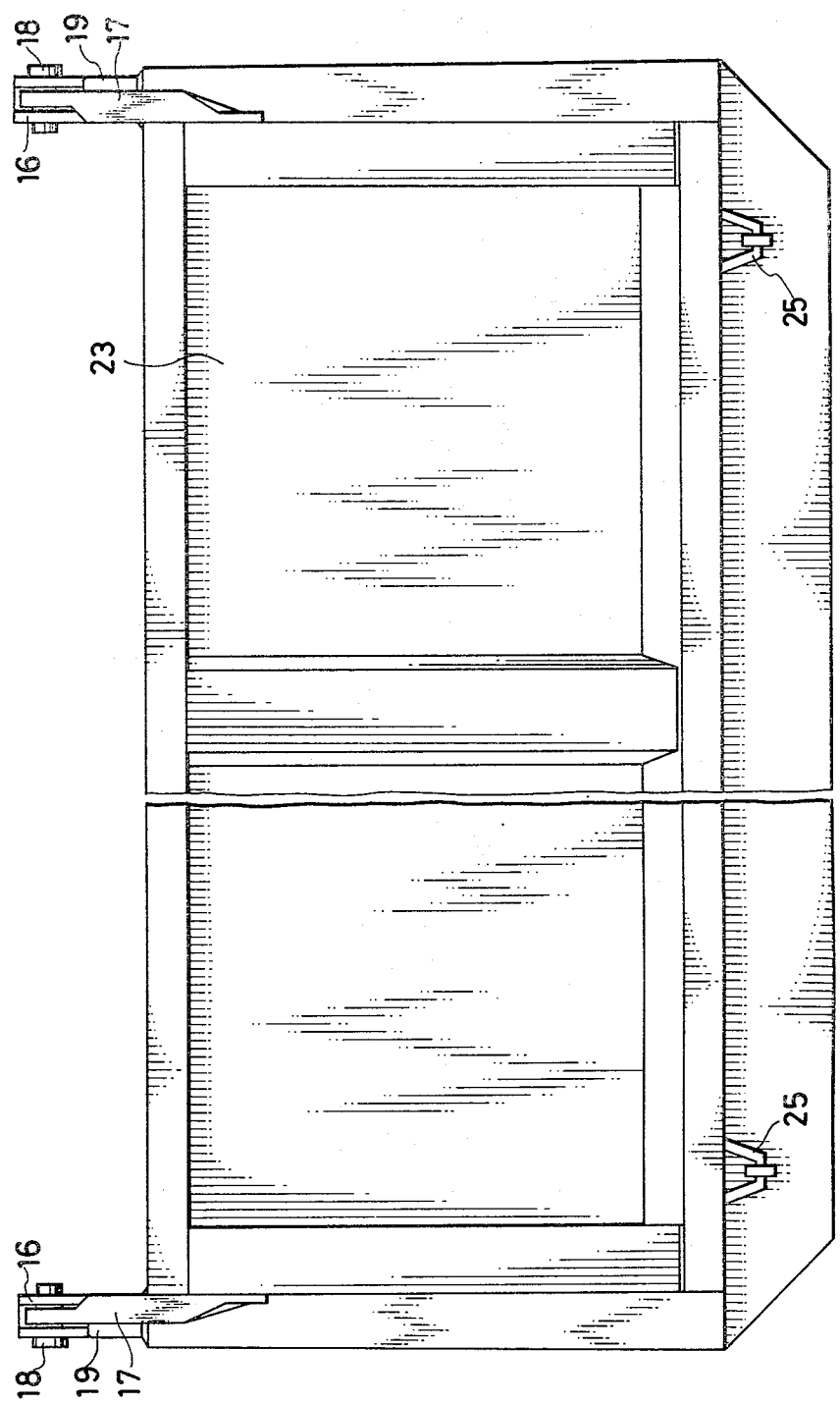

TAIL GATE OPENING/CLOSING DEVICE FOR DUMP TRUCK

BACKGROUND OF THE INVENTION

1. Field of the Invention

This invention relates to an opening/closing device for tail gate in the dump truck which is installed at the rear part of the carrier section thereof.

2. Description of the Prior Art

In a conventional type of dump truck in which a tail gate is opened by inclining the carrier section with a dump mechanism so as to discharge or dump the material to be transported such as sand, soil and gravel etc., the opening/closing device for the tail gate is a simple structure, as shown in FIGS. 12 and 13, where the arm (14) of the tail gate (13) is pivotally attached, by an axis (15), to the bracket (12) fixed to the upper ends of both side walls of the burden carrier (11). Thus, usually the tail gate (13) may be rotated rearwardly around a fulcrum point of the axis (15). However, in case of loading of sand and soil etc. higher than that of the tail gate (13), or in case of performing a fast inclination of the burden carrier (11), the upper part of the tail gate (13) is applied with a heavy load from the sliding soil and sand etc., so that it becomes difficult to rotate the tail gate (13) around the axis (15). Therefore, the sand and soil etc. are dropped down over the tail gate (13), the tail gate (13) is buried completely by the sand and soil etc., so that it sometimes occured that the dump truck may not be moved forward. Transmitting of the center of gravity of the dump truck is directed in a rearward direction when the sand and soil are discharged, thereby the front wheels of the dump truck are lifted up to cause a dangerous condition.

Further, in case of a conventional type of the opening/closing device for the tail gate, an opening of the tail gate is narrow, so that if the sand and soil contain a relatively large sized rock therein, they may not be discharged frequently unless the tail gate is removed therefrom, resulting in making a substantially less efficient operation. Narrow opening of the tail gate may not enable a high discharging or unloading of the sand and soil etc. in a narrow place, so that the conventional type of the dump truck shows such a disadvantage as requiring a little wider storing or accumulating place.

In reference to the above disadvantage, the conventional type of the system is made such that the bracket (12) is made high and the tail gate arm (14) is also extended. However, if the bracket (12) is made high, some dangerous conditions are found in which it is struck against the bucket of the power shovel etc. during a loading operation of the sand and soil etc. And extension of the arm (14) of the tail gate is apt to cause it to be easily broken and at the same time it shows such a disadvantage as the tail gate may not be operated smoothly when the material to be transported is discharged.

OBJECTS OF THE INVENTION

It is an object of the present invention to provide an opening/closing device for the tail gate in which when the sand and soil etc. are loaded over a height of the tail gate or even when the burden carrier is rapidly inclined by the dump mechanism, the tail gate is opened widely and smoothly and the sand and soil etc. are slid off smoothly.

It is another object of the present invention to provide an efficient and safe transporting operation of the sand and soil etc.

It is still another object of the present invention to provide a simple and rigid structure of the opening/closing device of the tail gate which may not be damaged.

The present invention relates to an opening/closing device for the tail gate of the dump truck and has its object to provide an opening/closing device for the tail gate of the dump truck characterized in that brackets are fixed to the upper ends of both side walls in the rear part of the burden carrier, one end of the bracket arm is pivotally arranged at each of the end parts of the bracket, respectively, and each of the other ends is pivotally arranged to the end part of the arm of the tail gate.

Other objects, features and additional features of the present invention will become more apparent from the following description in reference to the accompanying drawings.

BRIEF DESCRIPTION OF THE DRAWINGS

FIG. 4 is a rear view for showing the burden carrier.

DETAILED DESCRIPTION OF THE PREFERRED EMBODIMENT

Figure 1:
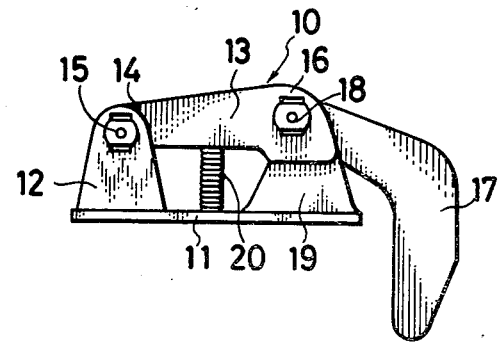
FIG. 1 is a side elevational view for use in showing a tail gate opening/closing device of one preferred embodiment of the present invention.

In reference to FIGS. 1 to 4 wherein one preferred embodiment of the present invention is shown, reference numeral 10 indicates a member of the tail gate opening/closing device, a bracket 12 is arranged at one of the mounting blocks 11, and one end part 14 of the bracket arm 13 is pivotally mounted on the upper end of said bracket 12 with the axis 15. Further, at the other end 16 of the bracket arm 13 is pivotally mounted an upper end of the slightly curved tail gate arm 17 with the axis 18. Reference numeral 19 shows a receptacle fitting arranged at the mounting block 11 which is constructed such that the other end part thereof 16 is supported by the receptacle fitting 19 when the bracket arm 13 is placed in its lateral direction. Reference numeral 20 shows a compressed helical spring, one end thereof is fixed to the central part of the bracket arm 13 and the other end thereof is fixed to the mounting block 11.

Figure 3:
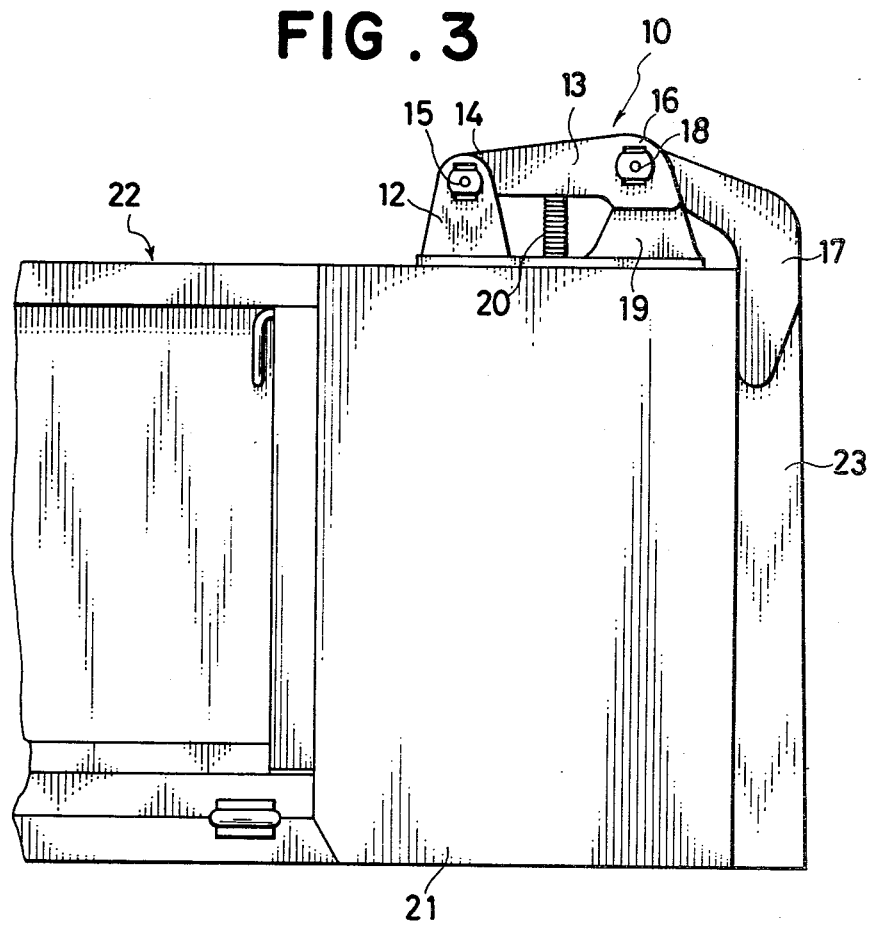
FIG. 3 is a partial side elevational view of FIG. 2
Figure 2:
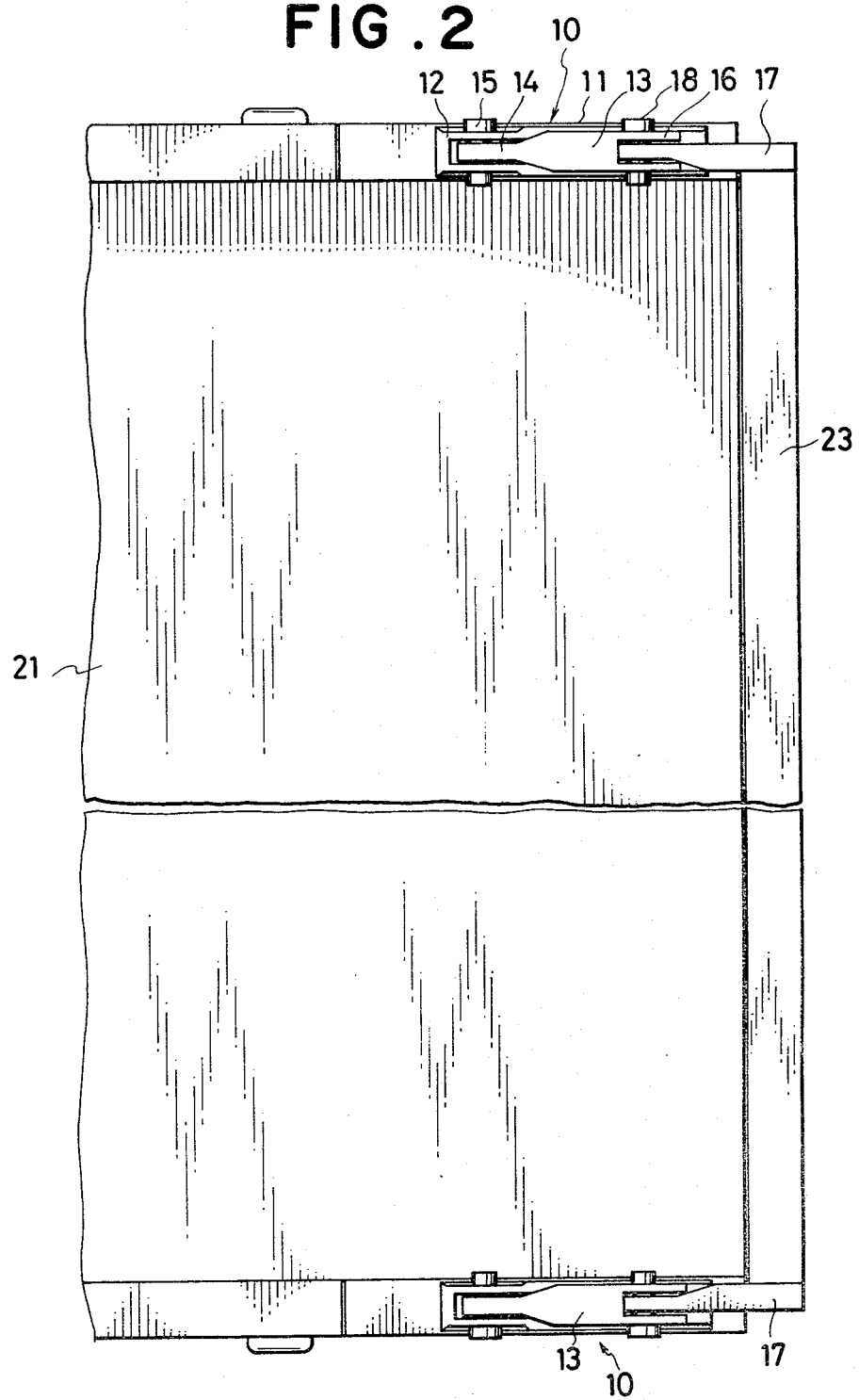
FIG. 2 is a top plan view for showing a rear part of the burden carrier to which the member shown in FIG. 1 is fixed.

In FIGS. 2, 3 and 4, reference numeral 21 indicates a carrier section of the dump truck 22 and each of said members 10 and 10 is welded to each of the upper rear end portions of both side walls. Lower end of each of the tail gate arms 17 is welded to the upper end of the tail gate 23, respectively. Reference numeral 25 indicates a lock means.

Figure 5:
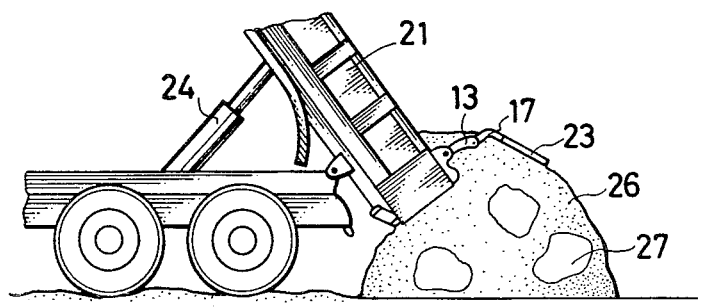
FIG. 5 is a side elevational view for showing a condition in which the burden carrier is inclined to cause the tail gate to be opened.

In accordance with the present invention, as shown in FIG. 5, when the carrier section 21 is inclined by a dump mechanism 24 after the lock means 25 is disengaged, the tail gate 23 is opened in a rearward direction under the pressure force of the sliding soil and sand etc., and at the same time, the bracket arm 13 and the tail gate arm 17 are rotated in an upward direction around fulcrums of the axis 15 and 18, and further the fulcrum point of the axis 18 is also moved in an upward direction. Therefore, the tail gate 23 may be smoothly opened and at the same time the dump discharge port is opened wider than that of a conventional type of the tail gate.

Therefore, even if the soil and sand 26 are piled over a height of the tail gate, or the carrier section is rapidly inclined, they may slide down without any restrictions from the wide-opened dump discharge port.

According to the present invention, the tail gate may not be prevented from being buried by some falling soils and sands, and the front wheels are not lifted up.

Further, even if substantial big rocks 27 are included in the load to be transported, they are not held in the tail gate but may fall freely, so that the transported load may be discharged fast, a transporting operation may be performed safely and at the same time an efficiency of operation may be improved more.

Further, in accordance with the present invention, the material to be transported such as soil and sand etc. may be dumped from a higher elevation position than that of a conventional type, so that a narrow storing accumulation place or site may effectively be used.

Further, in accordance with the present invention, there may be provided an extremely simple and rigid structure of the opening/closing device and at the same time the tail gate may be opened wide in a smooth manner when the sand and soil etc. are dumped, so that it is possible to prevent a break-down of the bracket arm, a tail gate arm, and a tail gate etc.

Further, it is possible to replace the tail gate opening/closing device of the present invention with a conventional or an existing tail gate opening/closing device of the dump truck.

Arrangement of spring 20 may prevent some shock from being produced when the tail gate is opened or closed and further arrangement of the receptacle fitting 19 may enable a supporting of the other end 16 of the bracket arm, however, spring 20 and the receptacle fitting 19 are not necessarily required.

Figure 6:
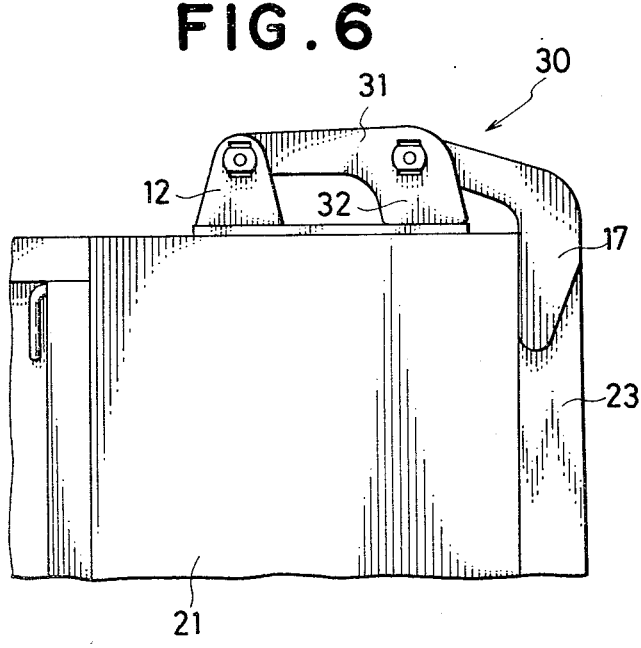
FIG. 6 shows another preferred embodiment of the present invention and is a side elevational view of an element in which a bracket arm for the tail gate arm is extended so as to form a supporting part.

FIG. 6 shows another preferred embodiment of the present invention and a structural feature of the member 30 differing from the member 10 shown in FIG. 1 in that the other end of the bracket arm 31 is extended downwardly so as to provide a bearing part 32.

Figure 7:
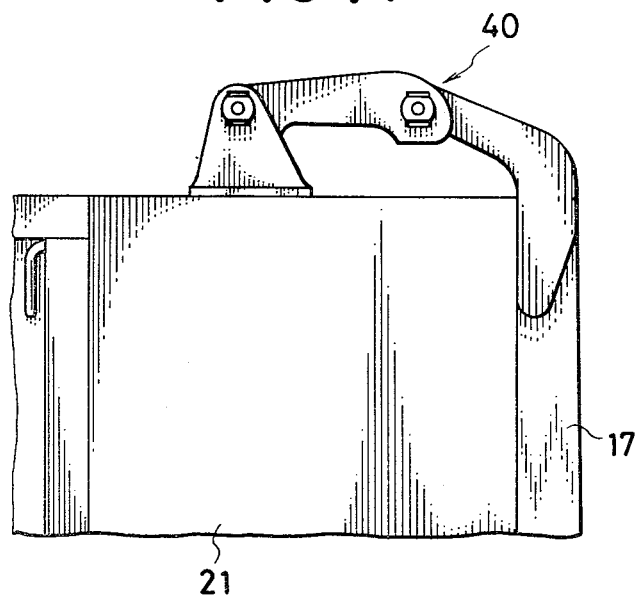
FIG. 7 is a side elevational view of a member in which a receptacle fitting is not provided.

FIG. 7 shows another preferred embodiment of the present invention, a structural feature of the member 40 differing from the member 10 shown in FIG. 1 is consisted in that it has no arrangement of the receptacle fitting 19 and the spring 20.

Figure 8:
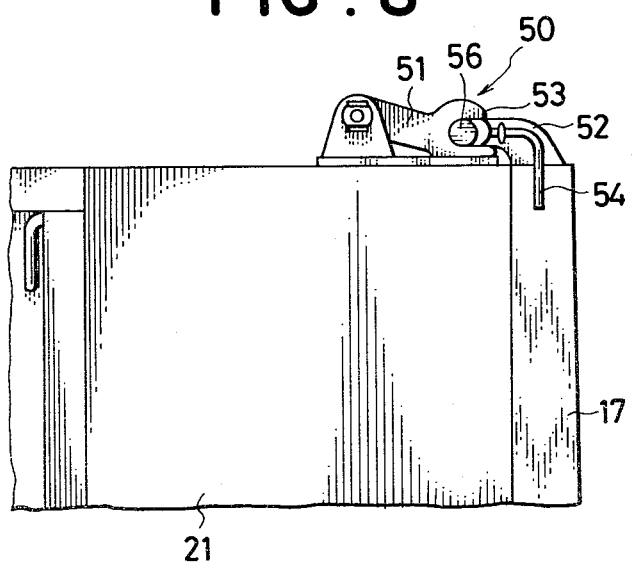
FIGS. 8 and 9 are a side elevational view of a preferred embodiment of a present invention in which a pivoting part between a bracket arm and a tail gate arm is removably installed.
Figure 9:
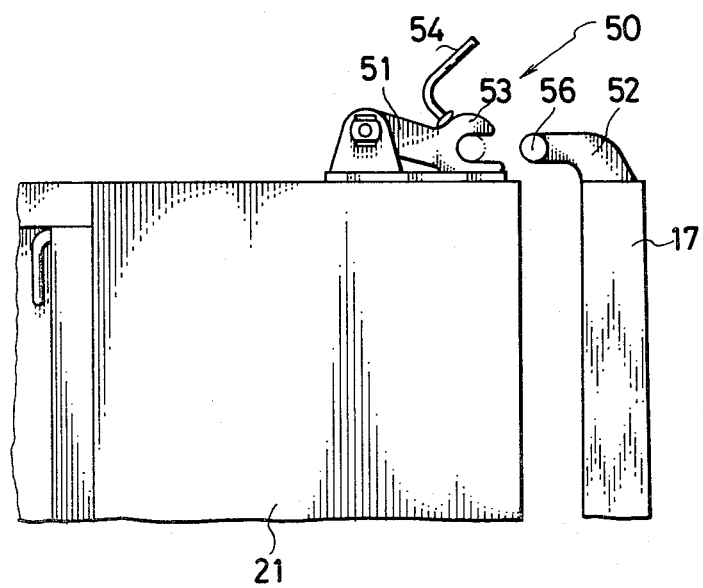

In the preferred embodiment of the present invention shown in FIGS. 8 and 9, a structural feature in which a pivotally arranged part 53 between the bracket arm 51 of the member 50 and the tail gate arm 52 is removably installed is different from that of each of the preferred embodiments of the present invention described above. That is, when a handle 54 at the pivotal part is rotated up to a position shown in FIG. 9, one end side part of the pivoted portion is opened so as to enable a removal of the tail gate arm 52 along with the axis 56 at its end part. The preferred embodiment is suitably applied for a small-sized dump truck.

Figure 10:
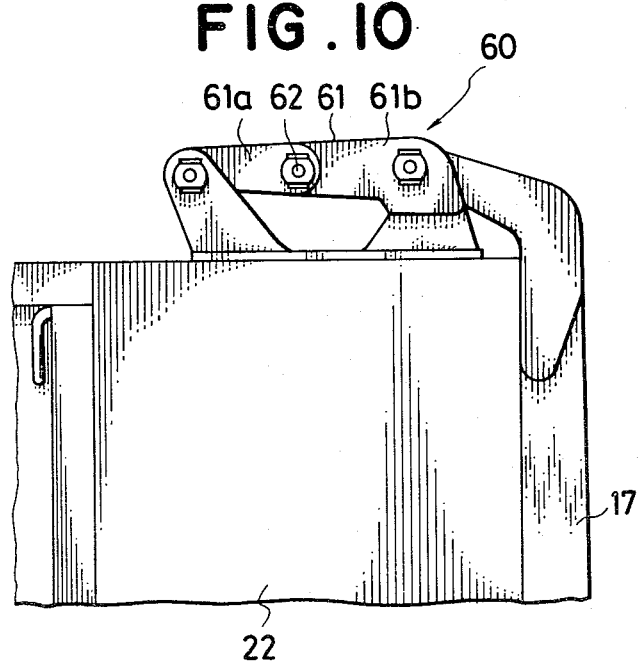
FIGS. 10 and 11 are a side elevational view of a preferred embodiment of a present invention in which two linkage plates are connected through a bracket arm.

In a preferred embodiment of the present invention shown in FIG. 10, a structural feature in which a bracket arm 61 of the member 60 having two linkage plates 61a and 61b is pivotally supported by an axis 62 is different from that of each of the preferred embodiments described above. In such a bracket arm 61 as above, the tail gate may easily and lightly be operated.

Figure 11:
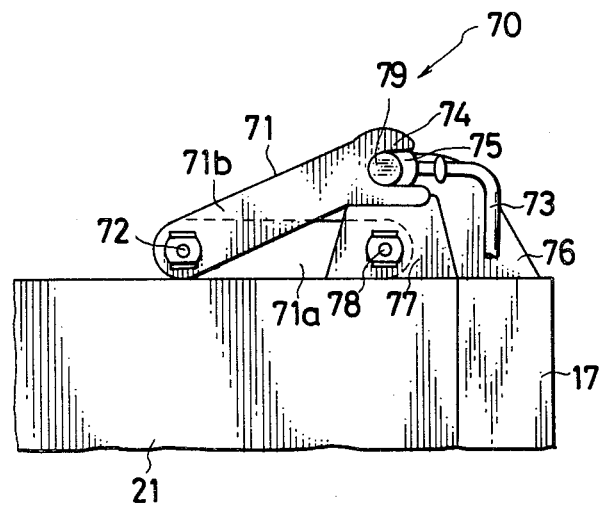
Figure 12:
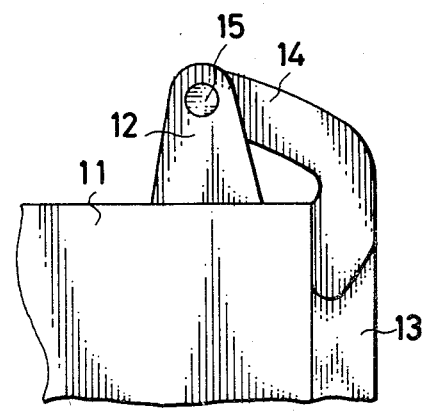
FIG. 12 is a side elevational view of a conventional type of a tail gate opening/closing device.
Figure 13:
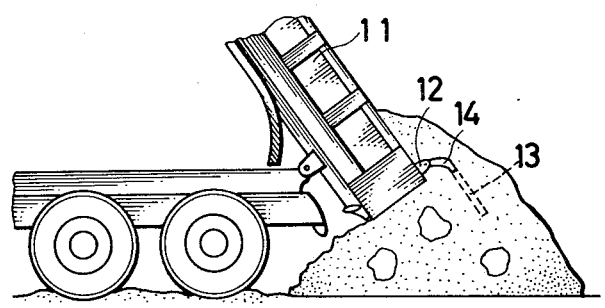
FIG. 13 is a side elevational view for showing a condition in which the tail gate shown in FIG. 12 is opened.

In a preferred embodiment of the present invention shown in FIG. 11, similar to the preferred embodiment shown in FIG. 10, two linkage plates 71a and 71b of a bracket arm 71 of member 70 are pivotally supported by an axis 72, and further as a preferred embodiment shown in FIG. 8, one side part 75 of the pivoted part 74 is opened by rotating the handle 73, and so the tail gate arm 76 may be removed along with its axis 79. The end part of the linkage plate 71a is pivotally mounted on a bracket 77 with axis 78.

Practical application of the present invention as a tail gate opening/closing device for a dump truck may provide a highly useful apparatus which may perform a transportation and an unloading of sands, soils, gravels and rocks etc.

What is claimed is:

1. In a dump truck with a rear carrier section, said dump truck having a pair of parallel vertical side walls each with a top rear end, and a tail gate at the rear end of said rear carrier section, a tail gate opening and closing device affixed to each side wall top rear end, said device comprising:
   (a) a flat mounting block affixed to each side wall top rear end, with a mounting block front and rear portion;
   (b) a fixed bracket (12) at said rear portion having an upper receiving first groove and means to pivotally receive a rear tongue of a bracket arm therein;
   (c) a bracket arm (13) with a rear first tongue portion sized to enter said groove and pivoted therein, a front open receiving second groove on said bracket arm, means to hold a second tongue therein pivotally, and a flat bottom part on said bracket arm;
   (d) a tail gate arm (17) with a rear second tongue sized to enter and pivot in said second groove, said tail gate arm having a bent elbow with a front forearm which can extend vertically downward and is fastened to the tail gate; and,
   (e) a flat part on said mounting block rear portion disposed for receiving thereon the flat bottom part on said bracket arm, whereby, when said dump truck rear section is tilted backwards, the tail gate will swing and tend to remain vertical allowing the material in the dump truck to be dumped, the bracket arm and flat bottom part will leave the flat part on said mounting block, and, when the dump truck rear carrier section is tilted forward, the bracket arm flat bottom part will again come to rest on the flat part on said mounting block.

2. A device as claimed in claim 1 including spring means (20) disposed between said mounting block and said bracket arm tending to hold said bracket arm flat bottom part and said mounting block flat part in engagement.

3. A device as claimed in claim 2 including a receptacle fitting (19) defined over said mounting block flat part, said receptacle fitting having a flat top part sized to engage said bracket arm flat bottom part.

4. A device as claimed in claim 1 including a bearing part (32) on said bracket arm, said flat bottom part being on said bearing part.

5. A device as claimed in claim 1 wherein said second tongue is removable from said means to hold said second tongue pivotally in said second groove.

* * * * *